United States Patent [19]

Vinciguferra

[11] Patent Number: 4,480,814
[45] Date of Patent: Nov. 6, 1984

[54] KEY FOR OPERATING BALL VALVES

[75] Inventor: Costantino Vinciguferra, Florence, Italy

[73] Assignee: Nuovo Pignone S.p.A., Florence, Italy

[21] Appl. No.: 411,845

[22] Filed: Aug. 26, 1982

[30] Foreign Application Priority Data

Sep. 2, 1981 [IT] Italy .................. 23731 A/81

[51] Int. Cl.³ .................................... F16K 31/00
[52] U.S. Cl. .................. 251/292; 403/359; 403/380
[58] Field of Search ............. 251/292, 291, 293, 128, 251/315; 403/354, 359, 380

[56] References Cited

U.S. PATENT DOCUMENTS

| 1,135,731 | 4/1915 | Smyser | 251/292 |
| 1,878,569 | 9/1932 | Zolleis | 251/292 |
| 3,155,368 | 11/1964 | Shafer | 251/315 |
| 3,586,357 | 6/1971 | Orain | 403/380 |
| 3,760,836 | 9/1973 | Albanese | 251/292 |

Primary Examiner—Martin P. Schwadron
Assistant Examiner—Sheri Novack
Attorney, Agent, or Firm—Hedman, Gibson, Costigan & Hoare

[57] ABSTRACT

A rectangular steel key on the control stem for operating the cast iron ball of a ball valve, wherein the key is provided with two large cylindrical steel joint pieces which are idly fitted onto the two ends of the key, and which are inserted into corresponding cylindrical cavities in the seat present in the pivot of the ball.

2 Claims, 3 Drawing Figures

KEY FOR OPERATING BALL VALVES

This invention relates to a new type of key for operating ball valves, by means of which an effective, reliable and lasting transmission of the operating torque from the control stem to the ball of the valve ball is achieved.

The ball of a ball valve is rotated by the action of a control stem which passes through a suitable bore in the valve body, and, acting in the manner of a screw driver, has its rectangular key-shaped end inserted into a corresponding seat provided in one of the two ball pivots.

However, this known method of has a series of drawbacks due substantially to the fact that the force transmitted by the rectangular key on the control stem is distributed uniformly over the inner surface of the seat only when there is perfect coupling between the key and seat, i.e. when the key mates exactly with its seat. Because of constructional imperfections or wear, this condition is never satisfied in practice, and consequently in known designs the key is slack in its seat. This can cause the key to rotate freely in its seat and produce an intolerable discrepancy between the rotation imposed by the control stem and the consequent rotation effectively made by the ball, as well as a concentration of the transmitted forces at the edges of the key. Moreover, for economical reasons the entire ball valve, including the pivot comprising the seat for the key, is made from cast iron, whereas the control stem and consequently its key are constructed of steel for strength reasons, because they must have the smallest possible cross-section in order to minimise the size of the bore in the valve body through which they have to pass. Thus the action of the steel edges of the key on the cast iron walls of the housing during the transmission of the concentrated operating forces inevitably results in the incision of the walls and the formation of recesses which increase the possibility of free rotation of the key. This increases the probability of discrepancy and makes the valve unreliable.

The object of the present invention is to obviate the aforesaid drawbacks by providing a steel key for operating ball valves which always perfectly engages the cast iron seat in the ball so that the force transmitted by it are always uniformly distributed over a large inner surface of the seat and do not generate damaging stress concentrations.

This is attained in that the rectangular steel key is engaged in the cast iron seat of the ball by interposing two large cylindrical steel joint pieces which are idly fitted on to the ends of the key and are inserted into corresponding cylindrical cavities in said seat.

Inasmuch, as the two said cylindrical point pieces can rotate about their own axis and can therefore always remain in contact with the major proportion of the inner surface of the corresponding cylindrical cavities of the seat, they ensure that the force transmitted by the control stem to the ball is always uniformly distributed over a large contact surface, thereby preventing dangerous stress concentrations.

The rectangular steel key on the control stem, which, for operating the cast iron ball of a ball valve, is inserted into a seat provided in one of the two pivots of the ball, is thus characterised according to the present invention by including two large cylindrical steel joint pieces fitted idly on to the two ends of the key which are inserted into corresponding cylindrical cavities in the seat.

The invention is described in detail hereinafter with reference to the accompanying drawings which illustrate a preferred embodiment thereof in which technical and constructional modifications can be made thereto without departing from the scope of the present invention.

Figure 1:
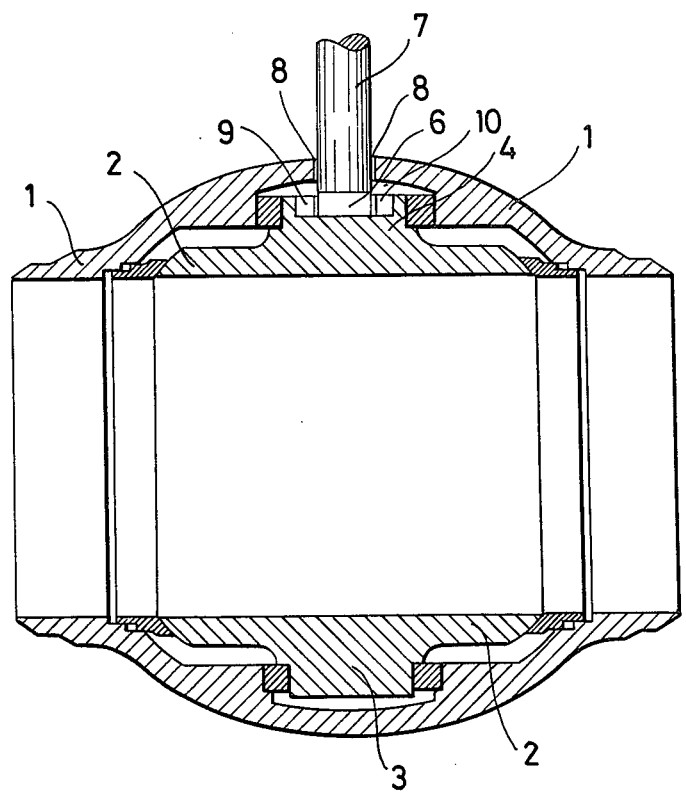
FIG. 1 is an axial front view, in section, taken through a ball valve using a key according to the invention.
Figure 2:
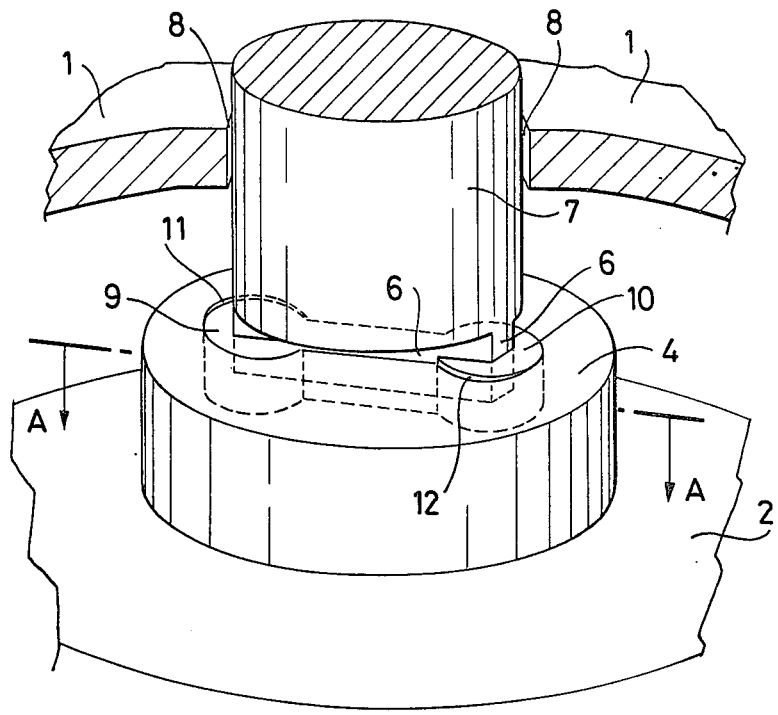
FIG. 2 is a partial perspective view on an enlarged scale of the key of FIG. 1.

Referring to the drawings, there is shown the valve body, of a ball valve with the ball 2 supported by the two pivots 3 and 4 formed in a single piece with the ball from cast iron.

Figure 3:
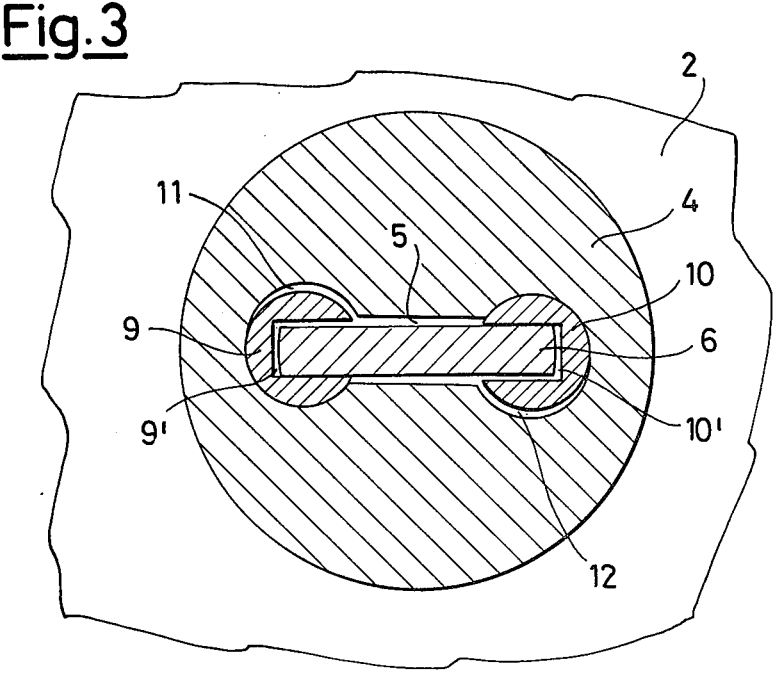
FIG. 3 is a plain view of FIG. 2, taken on the line AA of FIG. 2.

The upper pivot 4 is provided at its top with a channel 5 (see specifically FIG. 3) which acts as a seat for the rectangular key-shaped end 6 of a steel control stem 7 which passes through a suitable bore 8 provided in the valve body 1.

The rectangular key 6 is provided at its two ends with two large cylindrical steel joint pieces, 9 and 10 respectively, which are fitted idly thereon. More specifically, the two said cylindrical joint pieces 9 and 10 are each provided with a rectangular axial slot, 9' and 10' respectively, into which the ends of said key 6 are inserted.

Finally, the channel seat 5 is shaped to comprise cylindrical cavities, 11 and 12 respectively, arranged to house the joint pieces 9 and 10.

I claim:

1. In a ball valve having a valve body with a bore therethrough, a rotatable ball in the body having a pivot in alignment with the bore, and a control stem extending through the bore of the body and into the pivot of the ball for rotation thereof, an improved interacting pivot and stem which distribute forces over relatively large contact areas to avoid the dangerous concentration of stresses comprising:

a seat in the pivot of the ball having an intermediate channel with opposing relatively large cylindrical cavities at the ends thereof, and a key on the control stem insertable in said pivot and having an intermediate projection which corresponds to the configuration of said intermediate portion of said channel in said pivot with opposing relatively large cylindrical pieces fitted idly on the ends of said intermediate projection of said key which correspond to the configuration of said cylindrical cavities in said seats, whereupon the forces transmitted by rotation of the stem in the pivot are distributed over the large contact areas between said seat and said key as the stem causes the ball to rotate.

2. The ball valve of claim 1 wherein the ball is cast iron and said key is steel.

* * * * *